March 24, 1936.    G. F. HABERSTRO, JR    2,035,231
PARKING HARNESS
Filed July 3, 1934

INVENTOR
GEORGE F. HABERSTRO, JR.
BY his ATTORNEY

Patented Mar. 24, 1936

2,035,231

UNITED STATES PATENT OFFICE 2,035,231

PARKING HARNESS

George F. Haberstro, Jr., Buffalo, N. Y., assignor to Curtiss Aeroplane & Motor Company, Inc., a corporation of New York Application July 3, 1934, Serial No. 733,576

11 Claims. (Cl. 244—1)

This invention relates to the locking of aircraft while at rest upon a supporting surface, and more particularly to a means for preventing operation of, or damage to the control surfaces of a parked airplane.

When an airplane is parked on an open field, on the deck of an aircraft carrying vessel at sea, or on other exposed surfaces, the control surfaces are continually subjected to gusts of wind of considerable magnitude, the effect of which may also be aggravated by the pitching and rolling of the aircraft carrier. While many aircraft are provided with wheel brakes for parking purposes, or may have their wheels chocked, and are often lashed down to prevent displacement of the airplane, none of these devices or methods prevent the movement of such control surfaces as the rudder, elevator or ailerons. If such movements are not arrested or prevented, the rudder is whipped about from side to side and the ailerons and elevators are flapped up and down by even comparatively light gusts of wind. If these movements are unrestrained, it often occurs that the surfaces are damaged by being blown against other unyielding objects such as parts of other aircraft, bulkheads, railings, etc. These surfaces and their associated control mechanisms and operating cables are also subjected to excessive wear and may be damaged at times by forces causing the control surfaces to move beyond the limits of the normal control operation.

In aircraft having steerable tail wheels it is also desirable to apply and maintain a parking brake to maintain the tail wheel in a neutral or fixed position to prevent swinging of the tail due to the wind or other causes such as the rolling motion of the aircraft carrier, which otherwise might result in serious damage to the aircraft and also to other objects with which it might come in contact.

It is extremely important in locking the control surfaces of an airplane that the fact that the same are locked and, therefore, that the aircraft is not in condition to be flown, is readily manifest to the pilot before he seats himself. An aircraft locked in a different manner might conceivably be started without its condition becoming apparent to the pilot, with possible serious damage and injury to the airplane and its occupants. It is also desirable that means be provided whereby unauthorized persons are prevented from tampering with the aircraft, its control stick, or rudder controls with resulting damage to the airplane or its parts.

My invention consists of a simple method of accomplishing these results by anchoring the control stick and the rudder controls to some fixed object in the cockpit, such as the seat, by means of a suitable harness.

It is an object of my invention to provide a simple, and inexpensive harness to lock the control surfaces of a parked airplane in fixed or neutral position, so as to prevent the same from being flapped or whipped about by gusts of wind.

It is also an object of the invention to provide a harness, which can be readily applied or removed, and is of such a nature as to permit its being stowed in a small space and carried aboard the aircraft, such a harness being so characterized as to prevent the operation of the controls of a parked aircraft by unauthorized persons.

Another object of the invention is to provide a locking device for the control surfaces of such a nature as to indicate immediately to the pilot, that the controls are locked thereby eliminating the hazard of a take-off without first releasing such locking device.

A further object of this invention is to provide a means for maintaining the steerable tail wheel of an aircraft in a fixed or neutral position to prevent swaying of the tail portion of the aircraft and the possible straining and twisting of the fuselage frame.

Other no less important objects will appear from a reading of the annexed specification and claims, and from an examination of the drawing forming a part hereof, it being understood that the embodiment of the invention shown and described herein is by way of an example only and that other forms coming within the scope of the claims are intended to be included herein.

In the accompanying drawing in which like characters of reference indicate corresponding parts in all the views.

Figure 1:
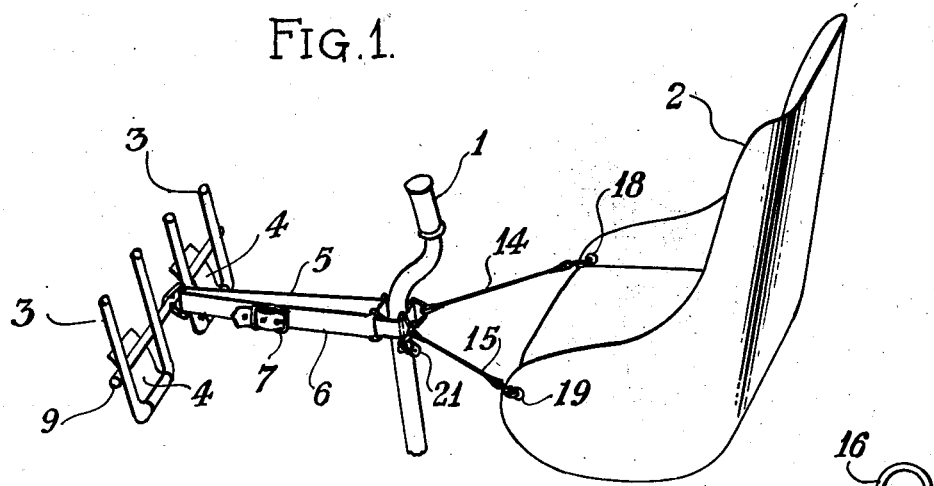
Fig. 1 is a view in perspective of the rudder controls, the control stick and the pilot's seat of a conventional aircraft showing my improved harness applied thereto.
Figure 2:
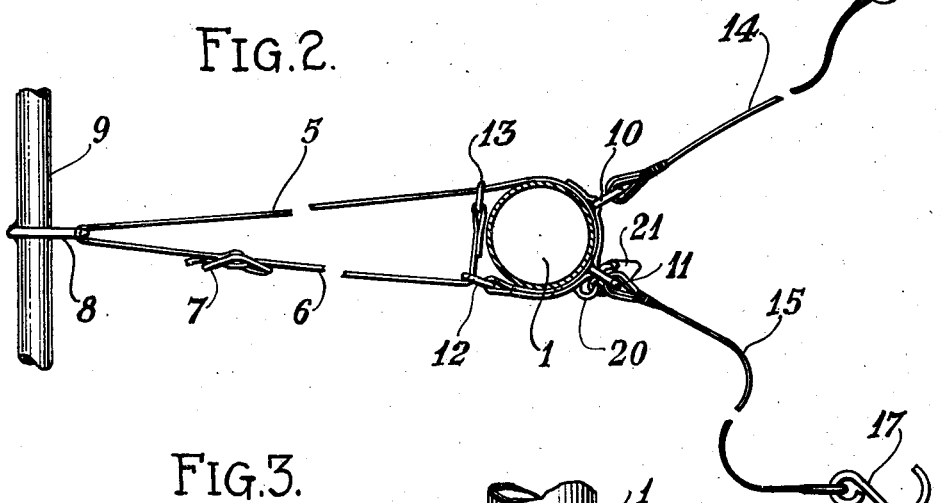
Fig. 2 is a plan view showing the control stick in section and the harness detached from the seat.
Figure 3:
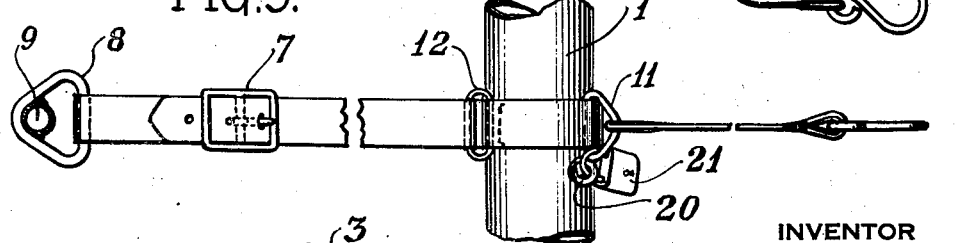
Fig. 3 is an elevation of Fig. 2 showing a portion of the control stick to which the harness is locked.

Referring to the drawing, Fig. 1 shows a control member 1, commonly known as the joystick, pilot's seat 2, rudder pedals 3 and brake treadles 4, all of which are typical of those to be found in a conventional type of aircraft, and will serve to illustrate a preferred embodiment of my invention.

With further reference to Fig. 1, the harness in the modification shown consists of a strap or webbing composed of two principal members 5 and 6 connected by a buckle 7 or other suitably adjustable fastening device. The straps may be of leather or canvas, belting or webbing, steel chain, braided flexible steel or any suitable flexible non-elastic material. The longer of the two principal strap members has the buckle or equivalent device 7 fastened to one end and passes through a triangular loop, eye or D-ring 8 which may, if desired, be welded or otherwise fastened to bar 9. The other end of strap member 5 is folded or doubled back upon itself, metal loops or rings 10, 11 and 12 being permanently held between the folded or doubled-back portion of the strap which may be riveted, sewn, or otherwise fastened.

The shorter strap member 6 is suitably pointed or tongued and is provided with eyelets, grommets, or other suitable engagements depending upon the nature of the device 7, through which may pass the pin or tongue of the buckle 7. The other end of strap 6 is provided with a loop or ring 13 which is swivably fastened within a similarly doubled-back and fastened portion of the strap. Before the buckle portion is riveted or fastened to the end of strap 5, it is passed through the loop 13 thereby insuring both strap members 5 and 6 being attached to each other at all times and preventing one part becoming lost or separated.

To each of the rings 10 and 11 are permanently fastened cables 14 and 15, which are provided at their outer extremities with S-hooks 16 and 17 respectively or other fastening devices such as spring snaps, which are adapted to be anchored in holes 18 and 19 or to equivalent fittings in some fixed part of the cockpit as for example the sides of the pilot's seat as shown. A metal bar or rod 9 which may be welded to the ring 8, referred to above, is adapted to be placed against the forward side of the rudder pedals 3 and is prevented from falling away from such pedals by virtue of its contact with the brake treadles 4. An eye or ring 20 is permanently fastened to the control stick 1 at a point where it may be locked to ring 11 by means of a padlock 21 or other suitable locking device.

Figure 4:
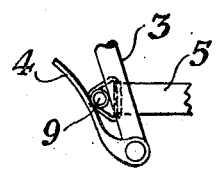
Fig. 4 is a fragmentary elevation showing the metal bar of the harness in position between the brake treadles and the rudder pedals.

In operation when applying the harness to the controls of the aircraft, the noose formed by the interlooped ends of straps 5 and 6, is slipped down over the control stick to a point where ring 11 would be adjacent to the eye 20 in the control stick. The cables 14 and 15 are then anchored to the seat by passing the S-hooks 16 and 17 into the holes 18 and 19 respectively. The bar 9 is then wedged down between the brake treadles 4 and the forward side of the rudder pedals 3 as shown in Fig. 4, with the buckle end of the strap passing through the ring 8. The tongued end of strap 6 is then threaded through the buckle 7 and drawn up tightly enough to put tension on both of the straps and the cables 14 and 15. The buckle is then fastened in this position and the padlock can be applied to lock eye 20 to ring 11. In a similar manner by reversing the above mentioned steps and operation the harness may be removed as desired.

When greater security is required, the harness may be made of materials which cannot be readily cut and the padlock may be applied to lock the two free ends of the strap members at the buckle, thereby preventing the loosening and removal of the harness without opening the lock.

It is to be understood that the drawing and the above description are for purposes of illustration only and various changes and modifications which may occur to one skilled in the art are to be considered within the scope and spirit of this invention.

I claim as my invention:

1. In an airplane in combination, a control stick, rudder pedals, brake treadles, a fixed part of said airplane and a parking harness comprising an assembly of interconnected members adapted to engage the said control stick, rudder pedals, brake treadles and said fixed part of the said airplane to restrain relative movement therebetween.

2. In an airplane having a control stick, rudder pedals and brake treadles, a harness composed of two strap members interlooped at one end of each of said strap members to fit around said control stick of the airplane, cables fastened to said interlooped portion of said strap members, the outer ends of said cables being adapted to be fastened to fixed parts of said airplane, a bar member adapted to be wedged between said rudder pedals and brake treadles, said bar member being adjustably attached to one of said strap members, the open ends of said strap members being provided with an adjustable fastening device and means for locking the said harness to said control stick.

3. In an airplane having a control stick, rudder pedals and brake treadles, a safety harness composed of two strap members interlooped at one end of each of said strap members to fit around said control stick of the airplane, cables fastened to said interlooped portion of said strap members, the outer ends of said cables being adapted to be fastened to fixed parts of said airplane, a bar member adapted to be wedged between said rudder pedals and brake treadles, said bar member being adjustably attached to one of said strap members, the open ends of said strap members being provided with an adjustable fastening device and means for locking said fastening device.

4. In an airplane having a control stick, rudder pedals and brake treadles, a locking device comprising a member adapted to engage the said pedals and treadles, a second member adapted to be attached to a fixed part of the said airplane, and means associated with the said members adapted to engage the said control stick and restrain movement thereof.

5. In an airplane having a control stick, rudder pedals and brake treadles, a locking device comprising a rigid member adapted to be inserted between the said pedals and treadles, a second member adapted to be attached to a fixed part of said airplane, and means interconnecting the said members and embracing the said control stick whereby movement of the said control stick is restrained.

6. In an airplane having a control stick, rudder pedals and brake treadles, a parking harness comprising a member adapted to engage the said pedals and treadles to restrain relative movement thereof, a plurality of tie members having ends adapted to be fastened to fixed portions of the said aeroplane, and adjustable means interconnecting the said members and engaging the said control stick adapted when in close adjustment to prevent operation of the said control stick.

7. In an airplane having a control stick, rudder pedals and brake treadles, a locking harness comprising a rigid member adapted to be interposed between the said pedals and treadles, a plurality of members having an end of each adapted for attachment to fixed parts of the airplane, and an adjustable member engaging the said members and the said control stick whereby tightened adjustment of the said adjustable member opposes movement of the said pedals and treadles in directions opposed to the said fixed parts of the airplane.

8. In an airplane, a control stick, brake and rudder controls, and a locking device comprising rigid and flexible members interconnected by an adjustable member, the said rigid member being adapted for positioning between said brake and rudder controls, the said flexible members being adapted for fastening to fixed parts of the said airplane, the said adjustable member engaging the said control stick such that when closely adjusted it serves to draw the said brake and rudder controls toward the said fixed airplane parts and to releasably hold the said control stick in a fixed position.

9. In an airplane having a control stick and rudder pedals, a locking device comprising a rudder pedal engaging member, anchoring means adapted for attachment to the said airplane and an adjustable member engaging the first said member and anchoring means and having a portion adapted to engage the said control stick such that tightened adjustment of the said adjustable member causes the said control stick, and rudder pedals to assume a fixed relationship with respect to each other and said aeroplane.

10. The combination of the locking device of claim 9 with additional locking means adapted to releasably fasten the said locking device to the said control stick.

11. In an airplane having a control stick and rudder pedals, a locking device comprising a rudder pedal engaging member and an adjustable control stick engaging member adapted to draw the said rudder pedals and control stick together and oppose the movement of either away from the other.

GEORGE F. HABERSTRO, JR.